United States Patent [19]

Tels et al.

[11] 4,351,807
[45] Sep. 28, 1982

[54] PROCESS FOR SELECTIVE EXTRACTION OF METAL IONS FROM AQUEOUS SOLUTIONS AND EXTRACTING AGENTS SUITABLE FOR THAT PURPOSE

[75] Inventors: Martinus Tels, Eindhoven; Jan P. Lotens, Duiven; Hendrikus P. M. Kivits, Eindhoven, all of Netherlands

[73] Assignee: Stamicarbon, B.V., Geleen, Netherlands

[21] Appl. No.: 209,121

[22] Filed: Nov. 21, 1980

Related U.S. Application Data

[60] Continuation-in-part of Ser. No. 52,415, Jun. 27, 1979, abandoned, which is a division of Ser. No. 907,704, May 9, 1978, Pat. No. 4,191,728, which is a continuation-in-part of Ser. No. 883,668, Mar. 6, 1978, abandoned.

[30] Foreign Application Priority Data

Mar. 9, 1977 [NL] Netherlands ............... 7702517

[51] Int. Cl.³ .................... C01G 3/00; C01G 51/00
[52] U.S. Cl. ........................... 423/24; 423/100; 423/139; 75/101 BE
[58] Field of Search ............ 423/24, 100, 139; 75/101 BE

[56] References Cited

U.S. PATENT DOCUMENTS

| | | | |
|---|---|---|---|
| 3,558,288 | 1/1971 | Burrows | 423/24 |
| 3,666,446 | 5/1972 | Cook et al. | 423/100 |
| 3,703,573 | 11/1972 | Blytas | 423/24 |

OTHER PUBLICATIONS

Spitzer, "Ingenieursblad", vol. 41, 1972, pp. 418–423.
Flett et al., "Ion Exchangers & Soluent Extraction", vol. 3, Marcel Dekker, N.Y., 1973, pp. 1–5, 14–20, 28–30, 36–40.
Pilpel, "Chemical Reviews", vol. 63, 1963, pp. 221–234.
Stecher (Editor), "The Merck Index", Merck & Co., N.J., 1968, 8th Ed., p. 763.

*Primary Examiner*—Herbert T. Carter
*Attorney, Agent, or Firm*—Cushman, Darby & Cushman

[57] ABSTRACT

An extraction process is described for the selective separation of metal ions belonging to the group Cu and Co, in aqueous solution of Cu- and Co-ions, wherein there is used as the extraction medium one or more unsaturated fatty acids, optionally in solution and/or in admixture with saturated fatty acids and an aliphatic oxime.

7 Claims, 3 Drawing Figures

PROCESS FOR SELECTIVE EXTRACTION OF METAL IONS FROM AQUEOUS SOLUTIONS AND EXTRACTING AGENTS SUITABLE FOR THAT PURPOSE

This application is a continuation-in-part of our earlier application Ser. No. 52,415 filed June 27, 1979, now abandoned, which in turn is a divisional of our earlier application Ser. No. 907,704 filed May 9, 1978, now U.S. Pat. No. 4,191,728, which in turn is a continuation-in-part of our earlier application Ser. No. 883,668 filed Mar. 6, 1978, now abandoned.

This invention relates to a process for selective extraction of bivalent metal ions of the Groups of Cu and Co, from an aqueous solution of Cu- and Co-ions, wherein there is employed an organic extraction medium.

BACKGROUND OF THE INVENTION

Processes of this kind are employed on a large scale in the recovery of metals from ores. After the metals are brought into an aqueous solution, the required metal ions are then extracted from such solution. In addition, this process is also employed for the recovery of metals from waste streams originating, for instance, from the electroplating industry, catalyst processing and the like.

Various materials have been used as organic extracting agents, such as thiobenzoylmethane dissolved in benzene or chloroform, together with a pyridine derivative, for extraction of nickel (See J. Inorg. Nucl. Chem. 31 (1969) p. 2612). For extraction of copper, nickel and cobalt, pyrophthalone or 5-nitropyrophthalone may be used (Russion Journal of Inorganic Chemistry, 18 (1973) no. 8). In addition, a great number of other extracting agents are known which are based on α- or β-hydroxyoxime compounds. One characteristic of these various extracting agents is that their use is, in most cases, expensive while a number of them exhibit undesirable, toxic properties. A general review of metal-extraction is given in Chemical Engineering, Aug. 30, 1976, pp. 86-94.

The purpose of the present invention is to provide a less expensive extracting agent which is simple to employ and which is also relatively non-toxic.

This invention has been developed by work of the above named inventors with the technical assistance of the Technical University at Eindhoven.

DESCRIPTION OF THE INVENTION

Surprisingly, it has now been found that it is possible for said metal ions to be extracted selectively from an aqueous solution thereof if the extraction takes place using an extracting agent based on oleic acid or on a mixture of oleic acid with other unsaturated fatty acids. Most preferably there is used a mixture consisting of at least 50% of oleic acid, the balance being essentially, for instance, linoleic- and/or linolenic acid. In addition to said components, the mixture may also contain some accounts of saturated fatty acids. This is, notably the case with technical grade oleic acid.

In a special embodiment of the invention a quantity of a (cyclo)aliphatic oxime, of from 6 to 12 carbon atoms, preferably cyclohexanone oxime, is added to the extraction agent mentioned above. In such embodiment, the weight ration of the fatty acid to oxime preferably lies between ½ and 50.

Addition of oxime to the extracting agent affects the 'distribution coefficients'. By 'distribution coefficient' ('m', hereafter), there is meant the ratio concentration of a given metal ions in the organic phase to the concentration thereof in the aqueous phase after the extraction system has essentially reached equilibrium. The presence of the oxime component has a positive influence on the selectivity, on the kinetics of the system, while also improving the separation of the organic and the aqueous phases after the extraction.

Furthermore in the case of extraction from acidic solutions, the loading of the organic phase is increased, so that the number of extraction steps, or the amount of extractant can be reduced.

For extraction of metal ions from aqueous solutions, a pH is used which is preferably in the range between 4 and 9. Notably, both Cu-ions and Co-ions, transfer into the organic phase to a considerable extent at pH values of between 6 and 9, while at a pH value of between 4 and 6.0 mainly only Cu-ions transfer into the organic phase. In a strongly acid medium, i.e., at pH values of less than about 2, all metal ions will again transfer into the aqueous phase, so that the organic medium may thereby be virtually freed from metal ions. This circumstance may be utilized in the practical realization of the present process.

The value of the pH for the extraction is not critical as such, and is essentially dependent upon and chosen according to the particular extracting agents used and depending upon the particular metal ions to be extracted from the aqueous solution. The exact required pH value for optimum results may in any case be established by means of simple trial tests using the selected extractant. It is advisable, however, that in any event the pH value chosen be less than about 8, due to possible reactions of the fatty acid.

The adjustment of the pH can be done with an acid or a base.

Preference is given to sulfuric acid as other strong acids have a tendency to react chemically with the extraction agent. As a base NH$_4$OH is preferred as due to the occurrence of the Cu-NH$_3$-complex a higher pH-value, combined with a higher amount of dissolved Cu can be obtained, resulting in a better extraction.

In general, the temperature at which the extraction is carried out will be room temperature, but this may vary according to the temperature at which the various liquids are available. The minimum temperature value is generally governed by the viscosity of the organic medium, which, of course, may not be too high. On the other hand, the temperature should not be so high that one or more of the components will evaporate to a high degree. Of course, the choice of the temperature also exerts an influence on the kinetics of the extraction and on the ease and completeness of separation of the organic and aqueous phases after the extraction.

The invention also relates to the extracting agents used in this process. The extracting agents may be employed both as such or in a solution. If a solution is used, the usual, mainly non-polar, aliphatic solvents may then be used, as a kerosene, hexane, isobutane, perchloroethene, or special solvents developed for extracting agents. It is also possible to employ slightly polar solvents, such as methylisobutylketone and the like, without having an adverse effect on the extraction. However, the solvent used should in any event be preferably substantially insoluble in the aqueous phase.

The preferred extraction agent consists, per liter, of 5–40 g of cyclohexanone oxime, 20–250 g of a fatty acid mixture mainly consisting of oleic acid, made up with a mainly non-polar solvent. The weight ratio of fatty acid to oxime may lie between about 0.5 and 50.

These values relate to extracting agents wherein the oxime is present in a sufficient quantity so that a distinct effect of the added oxime on the selectivity of the extraction is observable. It is possible, however, that the organic/aqueous phase separation, after the extraction, is less than satisfactory with certain compositions of extracting agents based only on fatty acids. In such a case, the phase separation may be appreciably improved by the addition of a very slight quantity of oxime to the fatty acid. In this case fatty acid/oxime weight ratios of the order of about 50 up to about 500, or even higher, may be used.

The advantage of the use of the extracting agents according to the present invention is especially experienced in the fact that simple, relatively inexpensive, chemical compounds are used. In general, these are also less toxic than the commonly used extracting agents. In addition, a notably higher rate for the nickel-ion extraction is observed, in contrast to the generally, low rates realized with previously known extraction agents.

The invention will now be illustrated with the aid of an accompanying drawing, which show:

Figure 1:
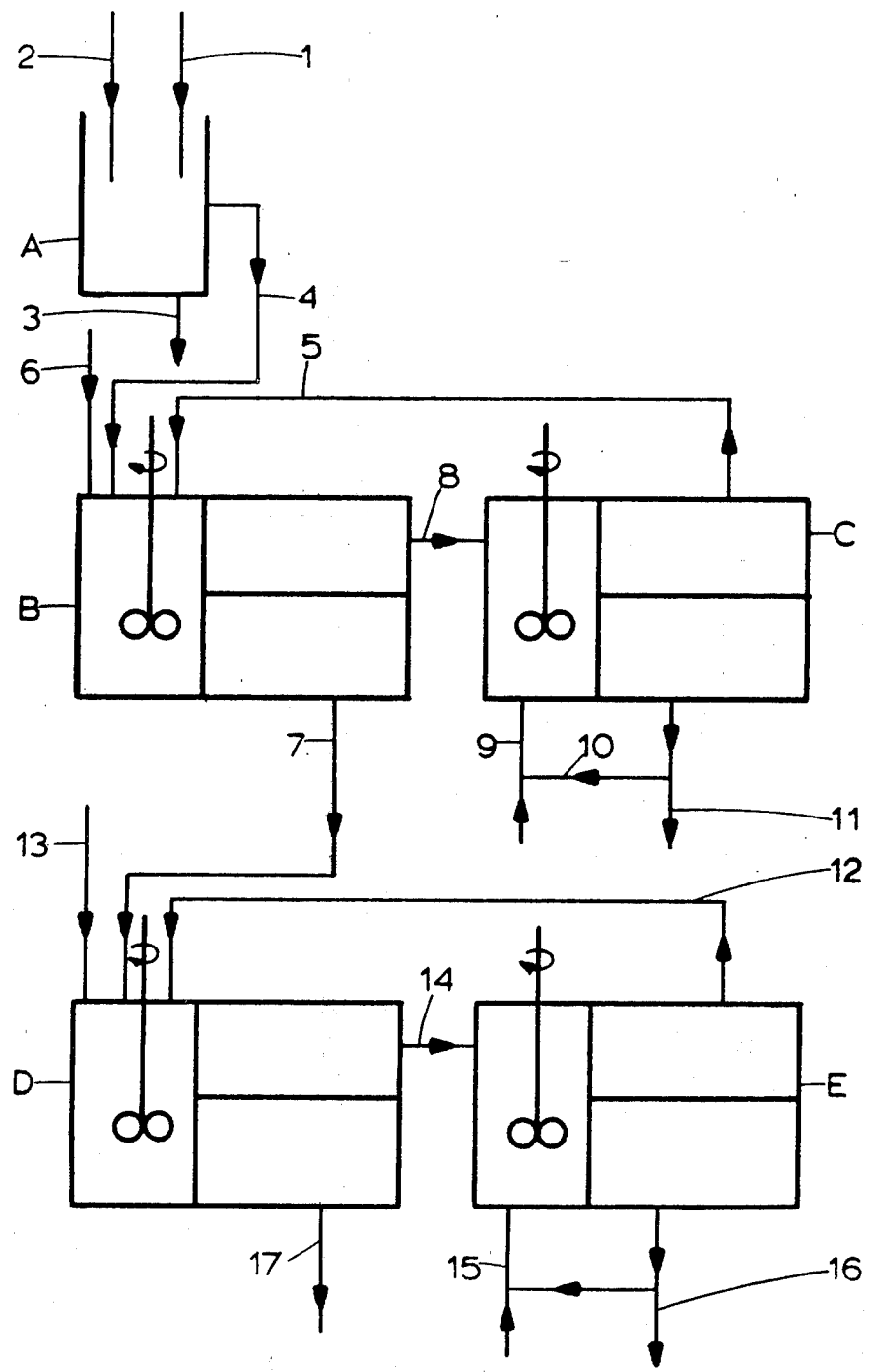
In FIG. 1, an embodiment of the process according to the invention for separation of Cu- and Co-ions originating, for instance, from a catalyst with the aid of fatty acids and oxime.

The invention is, of course, not limited to the embodiment as illustrated in FIG. 1.

The figure schematically represents an installation mainly consisting of a dissolving vessel A and four mixer-settler units B, C, D and E. A description of a mixer-settler unit of this kind is given in Chemical Engineering, Jan. 19, 1976, at pp 99 and 97, the disclosure of which is incorporated herein by reference. Besides such mixer-settler units it is also possible to use other equipment suitable for extraction, like a pulsation column. A description of such a pulsation column is given in the Dutch Patent Specification No. 123,177, the disclosure of which is incorporated herein by reference.

Via line 1 a quantity of solid material mainly consisting of a mixture of oxides of Cu and Co is passed to vessel A. Via line 2 such a quantity of acid is added, for instance sulphuric acid, that the aqueous pH is adjusted to a value of between 2 and 3, as a result of which Cu- and Co-ions are dissolved. Via drain 3 the remaing solid is discharged. The acid solution thus formed, containing the Cu- and Co-ions, is then passed to the mixer part of the vessel B via line 4. Via line 5 an organic extractant liquid, originating from unit C, is supplied, essentially consisting of a hexane solution (11 wt.-% of solutes) of cyclohexanone oxime (1 parts) and a mixture of fatty acids (10 parts). The fatty acid used is commonly commercially available as 'technical-grade oleic acid'. An amount of caustic is supplied via line 6 such that the pH is now adjusted to a value between 5.5 and 6.0. As as result the Cu-ions are substantially extracted into the organic phase. The Co-ions remain in the aqueous phase and removed via line 7 and introduced in unit D.

Next, the separated organic phase is passed from unit B to the mixer part of unit C via line 8. An amount of sulphuric acid is supplied via line 9 such that the pH is now adjusted to between a value of −2 and +1, as a result of which the Cu-ions transfer into the aqueous phase. A large portion of this aqueous phase is recycled via line 10 from the settler part of C to the mixer part. This has the advantage that Cu-sulphate now become crystallized. The crystals thus formed may be separated off, continuously or discontinuously, and supplied, via line 11, to for example, a centrifuge and dryer. In this way, an extra purification step is included in the process, for the crystallization step minimizes the presence of impurities, which may possible have also been extracted, and which may have a disturbing effect on a subsequent stage of the process, or even contaminate the desired end-products. It is also possible to use acetic acid to lower the pH-value. In that case copper acetate is formed.

Via line 12, an organic extracting agent is supplied, to unit D, originating from unit E, and which is the same as the aforementioned mixture of fatty acids and cyclohexanone oxime dissolved in hexane. A quantity of caustic, preferably $NH_3$, is added via line 13 such that the pH value of the solution is adjusted to between 6 and 9. As a result of this change in the pH, the Co-ions are now substantially extracted into the organic phase in unit D. The remaining aqueous phase which is substantially free from metal ions, can be removed from unit D via line 17.

Via line 14 the organic phase from unit D is passed to the mixer part of unit E, to which an amount of acid, preferably, acetic or sulphuric acid, and a part of the aqueous phase from the settler part of unit E are supplied via line 15. Due to the liquid now becoming strongly acid (i.e., a pH of −2 to +1), the Co-ions transfer back to the aqueous phase. The organic phase, which is now substantially free of metal ions, is then recycled to unit D, while the aqueous phase is discharged via line 16 to recover the Co-ions therefrom, if desired after crystallization by recirculation of the aqueous phase. The resulting aqueous solution containing cobalt salts can be processed according to any suitable method know in the art, such as crystallization, to recover the cobalt salts.

In the embodiments of the process according to the invention described above, it has been assumed that no loss of organic medium occurs. In practice, a small portion of the organic medium will invariably become dissolved in the aqueous phase, so that make-up of the organic medium is necessary.

The invention is further illustrated with the aid of the following test examples, but is, of course, not limited thereto. In these tests, the distribution co-efficient for the given metal ions, and the specified extraction agent, is measured at varying pH's, and the data numerically demonstrate the extraction procedures of this invention.

EXAMPLES OF THE INVENTION

Example 1

On laboratory scale an aqueous solution of Cu-ions was prepared by dissolving such an amount of $CuSO_4$ in water that the Cu-concentration was 4.9 g/l. With the aid of an extracting agent of varying compositions at different pH values these Cu-ions have been extracted. The phase volume ratio was 1:1.

In Table 1 below the distribution coefficient (m) of the Cu-ions is given as a function of the pH value. The extracting agent used was 10 ml of oleic acid mixture, as described above, and 90 ml of methylisobutylketone, in which 1 g of cyclohexanone oxime is dissolved.

TABLE 1

| Test No. | pH | m |
|---|---|---|
| 1 | 3.7 | 1.8 |
| 2 | 4.0 | 3.0 |
| 3 | 4.2 | 3.9 |
| 4 | 6.3 | 118.3 |
| 5 | 7 | 119 |

The Table illustrates the ability to adjust the extraction of copper into the organic phase by adjustment of the pH.

In the next tests, in which Cu-ions have been extracted from an aqueous solution as in Example 1, the distribution coefficients have been determined in the same phase ratio as in the tests 1 to 5 incl.

A = 25 ml of oleic acid, 75 ml of kerosene, 1 g of cyclohexanone oxime.

TABLE 2

| Test No. | pH | A |
|---|---|---|
| 6 | 3.7 | 0.1 |
| 7 | 4 | 1 |
| 8 | 7 | 20 |

Example 2

A watery solution obtained by dissolving Cu and Co containing waste with sulphuric acid containing 10.6 gr/l bivalent Cu and 1.6 g/l bivalent Co was extracted with the aid of an extraction agent containing 10% by weight of oleic acid, technical grade, 1% by weight of cyclohexanonoxime and 89% by weight of kerosene. The phase volume ratio was 1:1.

In the table below the distribution coefficients (m) of Cu and Co are given at different pH-values.

TABLE 3

| Test No. | pH | $n_{Cu}$ | $m_{Co}$ |
|---|---|---|---|
| 9 | 4.6 | 2.24 | 0.024 |
| 10 | 5.7 | 17.3 | 0.03 |
| 11 | 6.6 | 114.14 | 0.07 |

Example 3

Continuous countercurrent extraction of Cu and Co

To obtain approximate phase equilibrium in each stage during continuous countercurrent operation the residence time in an extraction vessel should exceed five minutes. Also, the pH in the mixers must be kept constant at a predetermined value.

To be able to produce a pure cobaltsalt it is necessary to extract substantially all of the copper in the initial procedure. At the same time it can also be worthwhile to produce a coppersalt with no cobalt or with a specified low cobalt amount. This can be realized in practice by operating at a low pH, e.g. pH=4.4, in the feed mixing vessel. But the ultimate fineness of the cobaltous raffinate that then can be obtained, with every mixer at a constant pH=4.4 is 0.1 g/l Cu alongside 6 g/l Co. Higher separation efficiencies can be achieved by:

- increasing the volume ratio of the organic and the aqueous phase, which means for a 99.9% pure cobaltous raffinate a ratio of approximately 10, which is uneconomical
- allowing a higher Co content in the Cu containing organic phase going to the strip section, which means a higher pH (e.g. pH=4.8) in the feed vessel can be applied, resulting in a greater loading capacity of the organic phase
- extracting Cu in the stages, at the far end of the feed stage, at higher pH values.

Figure 2:
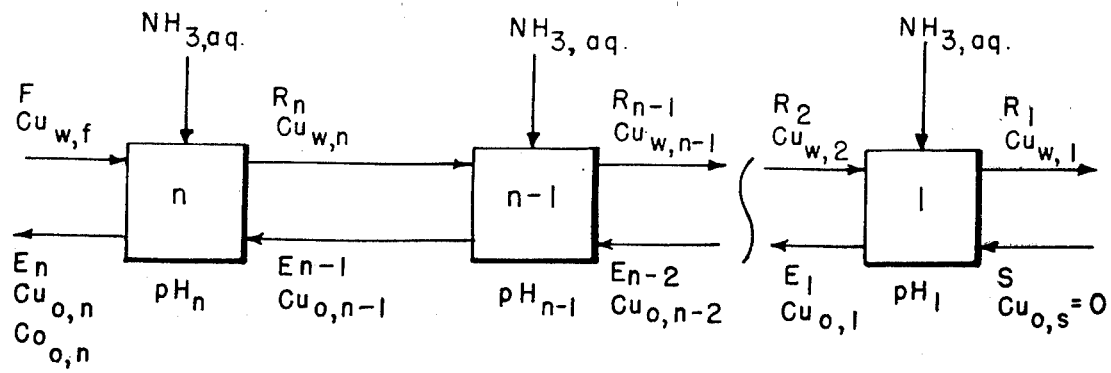
FIG. 2 is a flowsheet illustrating the process of Example 2.

The last method proved to be the best, so experiments sticked mainly to these circumstances. An example of a Cu extraction experiment with constant and equal pH in all the mixing vessels and with increasing pH is given in table 4, with reference to the as shown in FIG. 2.

TABLE 4

| n | F | $Cu_{w,F}$ | S | $Co_{o,n}$ | $pH_n$ | $Cu_{w,n}$ | $Cu_{o,n}$ |
|---|---|---|---|---|---|---|---|
|  | l/h | g/l | l/h | g/l |  | g/l | g/l |
| A: — | | | | | | | |
| 4 | 0.73 | 12.6 | 1.81 | <0.01 | 4.3 | 6.5 | 4.89 |
| 3 | | | | | 4.6 | 0.97 | 2.96 |
| 2 | | | | | 4.4 | 0.62 | 0.74 |
| 1 | | | | | 4.5 | 0.22 | 0.18 |
| B: 6 | 0.74 | 12.06 | 1.82 | <0.01 | 4.3 | 8.44 | 5.01 |
| 5 | | | | | 4.3 | 5.05 | 3.60 |
| 4 | | | | | 4.5 | 1.012 | 2.16 |
| 3 | | | | | 4.45 | 0.479 | 0.44 |
| 2 | | | | | 4.75 | 0.068 | 0.21 |
| 1 | | | | | 5.05 | 0.007 | 0.028 |

Stripping of the copper containing organic phase with both sulphuric acid and acetic acid was always easy to perform in two mixer settlers.

Figure 3:
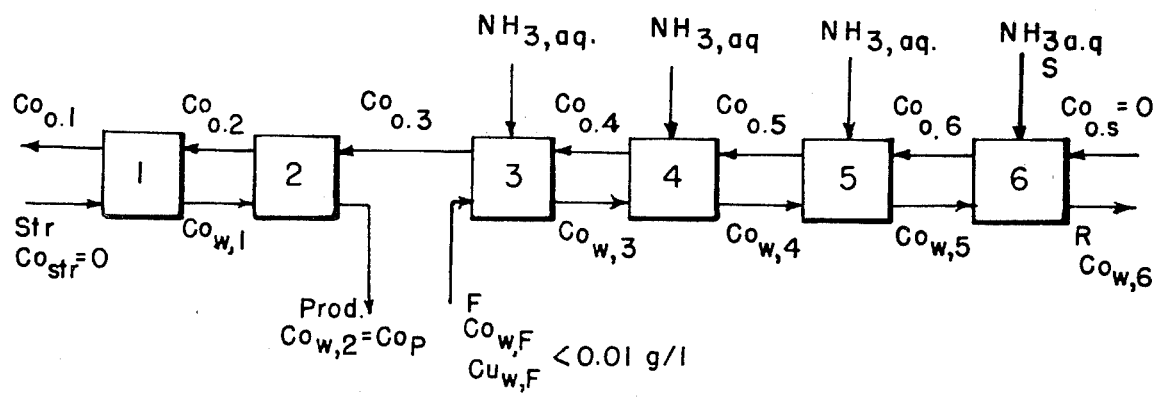
FIG. 3 is a flowsheet illustrating the process of Example 3.

After a batch of Co containing raffinate was produced with <0.01 g/l Cu, also the Co was extracted in a similar way as Cu. With 4 stages at pH ~7 over 99% of the Co could be extracted. The cobalt containing organic phase was extracted with a 10% acetic acid solution in two stages ($\phi_{strip}/\phi_{org}$. ~1). Co-acetate was produced from the stripliquor by crystallization. The analysis of that experiment have been given in table 5, with reference to the flowsheet as shown in in FIG. 3.

TABLE 5

| n | F | $Co_{w,F}$ | S | Str. | $Co_p$ | $pH_n$ | $Co_{w,n}$ | $Co_{o,n}$ |
|---|---|---|---|---|---|---|---|---|
| — | l/h | g/l | l/h | l/h | g/l | — | g/l | g/l |
| 3 | 1.48 | 2.73 | 1.47 | 1.54 | 2.59 | 6.8 | 0.58 | 2.72 |
| 4 | | | | | | 6.9 | 1.12 | 0.59 |
| 5 | | | | | | 6.9 | 0.05 | 0.11 |
| 6 | | | | | | 7.0 | 0.02 | 0.033 |
| 2 | | | | | | 3.3 | 2.59 | 0.55 |
| 1 | | | | | | 2.8 | 0.52 | <0.01 |

We claim:

1. A process for the selective extraction of copper metal ions from an aqueous solution containing copper and cobalt metal ions, the process comprising the steps of:

a. contacting said aqueous solution at a pH of 4.0 to 6.0 with a substantially immiscible organic extraction agent essentially composed of
   a mixture of (1) oleic acid, or (2) oleic acid, and
   at least one other unsaturated fatty acid with a (cyclo)aliphatic oxime of from 6 to 12 carbon atoms
   thereby formimg a copper-ion rich organic phase and a cobalt-ion rich aqueous phase, and b. extracting substantially all of the copper, recovering and removing said copper as a copper salt from the organic phase.

2. The process according to claim 1, wherein the fatty acid component of said mixture contains at least 50% of oleic acid.

3. The process according to claim 1, wherein linoleic acid or linolenic acid is also present together with said oleic acid in the extraction agent.

4. The process according to claim 1, 2, or 3 wherein the oxime is cyclohexanone oxime.

5. The process according to claim 1, wherein the fatty acid/oxime weight ratio is between about 0.5 and 500.

6. The process according to claim 5, wherein the fatty acid/oxime weight ratio is between about 0.5 and 50.

7. The process according to claim 1, wherein contacting step (a) is conducted at a pH in the range of about 4.6 to about 5.7.

* * * * *